UNITED STATES PATENT OFFICE.

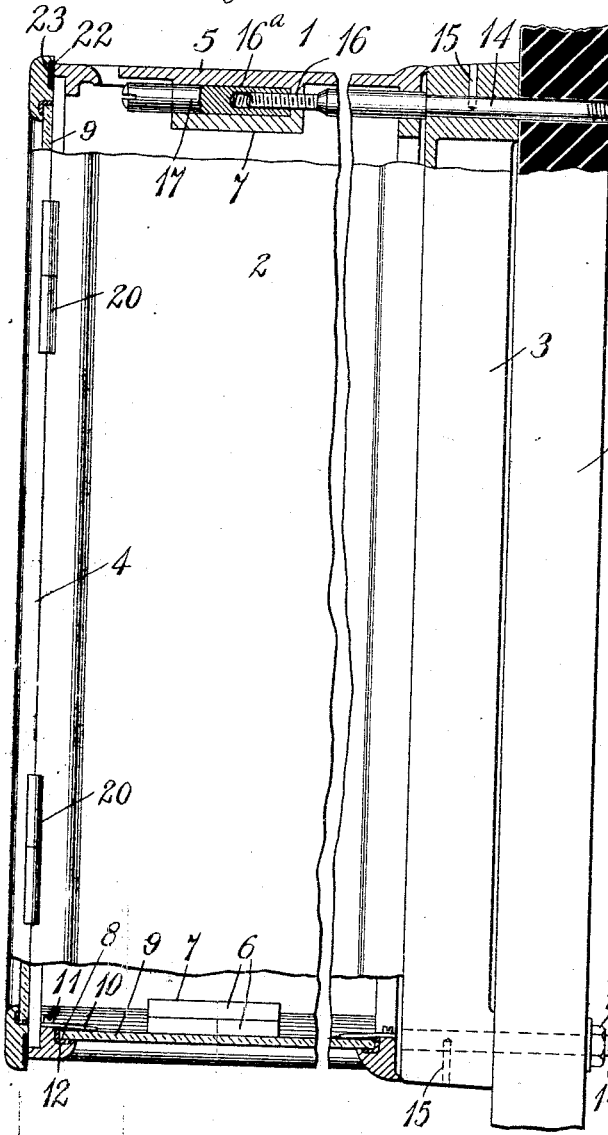
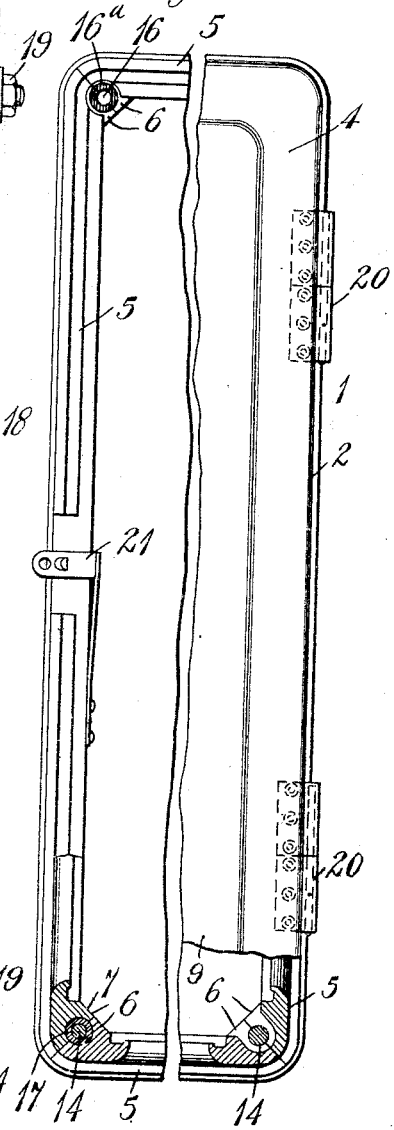

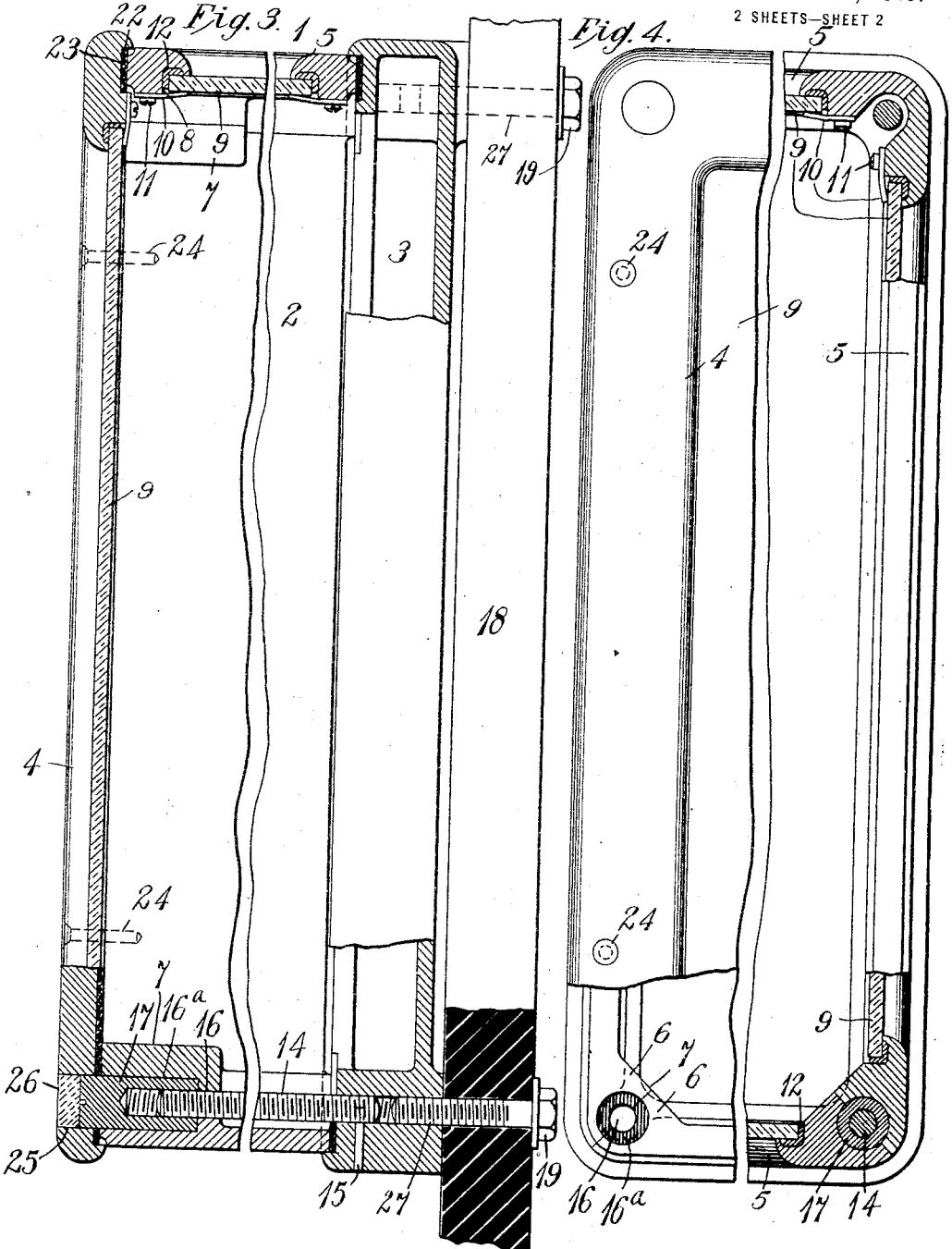

FREDERICK W. ANDREW, OF WILKINSBURG, PENNSYLVANIA, ASSIGNOR TO WESTING-HOUSE ELECTRIC AND MANUFACTURING COMPANY, A CORPORATION OF PENNSYLVANIA.

METER-CASE.

1,158,768.   Specification of Letters Patent.   Patented Nov. 2, 1915.

Application filed October 8, 1910. Serial No. 586,083.

*To all whom it may concern:*

Be it known that I, FREDERICK W. ANDREW, a citizen of the United States, and a resident of Wilkinsburg, in the county of Allegheny and State of Pennsylvania, have invented a new and useful Improvement in Meter-Cases, of which the following is a specification.

My invention relates to boxes or cases and it has special reference to such devices as are adapted to contain the operating mechanisms of various classes of meters or other instruments.

The object of my invention is to provide a case of the above-indicated class which shall be simple, durable and light in structure, as well as dust-proof and inexpensive, and which shall embody means for securing the body portion to the base without sacrificing unnecessary space in the interior of the case.

According to my invention, I provide a meter case which preferably comprises a plurality of separate side pieces having enlarged mitered end portions secured together by a welding or brazing process to form an integral body frame having relatively thick corner portions. Such a frame could, of course, be cast as a single unit, but considerable difficulty and expense would be involved which might render it impracticable as a commercial product, whereas the individual side pieces may be cast separately with little difficulty, and may be brazed together at comparatively little expense.

The method of attaching the body frame to the base is particularly economical of space, as the bolts are located in the extreme corners and are fastened to the enlarged corner portions or bosses by cap nuts, which are removable from the top of the case, thereby greatly facilitating the operation of removing the case, when adjustments or repairs are necessary. Furthermore, with this type of construction, an exceptionally satisfactory case, having glass sides and cover, may be provided, as the component pieces may be readily cast to receive glass plates which may be set therein in such manner as to provide absolutely dust-proof joints, a feature of prime importance in meter case construction.

In the accompanying drawings, Figure 1 is a view, partially in side elevation and partially in vertical section, of a meter case constructed in accordance with my invention. Fig. 2 is a view, partially in plan and partially in horizontal section, of the meter case shown in Fig. 1. Fig. 3 is a view, partially in elevation and partially in vertical section, of a modified construction of the case shown in Fig. 1, and Fig. 4 is a view, partially in plan and partially in horizontal section, of the meter case shown in Fig. 3.

Referring to the accompanying drawings, a case or box 1 comprises a multi-sided body frame 2 which is suitably secured to a base plate 3 and is provided with a cover 4.

The body frame 2 comprises a plurality of separate side pieces 5 which are mitered at their ends and are intimately secured together by a brazing or welding process. Each side piece 5 is provided with an enlarged portion 6 at each end, said portions being of materially less height than the side piece itself. The correspondingly located enlarged portions 6 of adjacent side pieces 5 abut against each other to form bosses 7 in the extreme corners of the case, for the purpose of mounting, as will be hereinafter described.

The cover 4 and the side pieces 5 are of skeleton structure and each is provided, on its inner side, with a recess 8 to receive the edge of a glass plate 9 which is disposed therein and secured in position by means of clips 10 and screws 11. Dust-proof joints are obtained by setting the glass plates in putty 12, or any other suitable plastic material for accomplishing the same purpose.

The body frame 2 is secured to the base plate 3 by means of bolts 14 which are fastened rigidly to the base plate at its corners by pins 15. The upper ends of the bolts 14 project through openings 16 into enlarged recesses 16ᵃ in the bosses 7 to receive cap nuts 17 and thus secure the body frame 2 to the base plate 3.

Referring particularly to the meter case shown in Figs. 1 and 2, it will be observed that the lower ends of bolts 14 project through the base plate 3 and are secured to an insulating plate or panel 18 by means of nuts 19. The cover 4 is provided with hinges 20 and fastening clip 21, in accordance with well known practice.

Since the cap nuts 17 are readily accessible from the top of the case, when the cover 4 is swung back upon its hinges, it is possible to remove the body frame 2 and cover 4 from the base plate 3 as a unit without detaching the base plate and its associated mechanism (not shown) from the insulating panel 18.

A dust-proof joint between the hinged cover 4 and the upper edge of the body frame 2 is provided by means of a felt gasket 22, which is disposed within a recess 23 in the under side of said cover. Obviously, any other suitable material may be employed as a gasket and may be associated with the body frame itself, if desired.

Reference may now be had to Figs. 3 and 4, in which a meter case of similar construction to that shown in Figs. 1 and 2 is illustrated, similar parts bearing like reference numerals.

It will be observed that the cover 4 is secured to the body frame 2 by screws 24, and openings 25 are provided in the corners of the cover to register with recesses 16ª in the bosses 7, for the purpose of receiving the cap nuts 17. Cement 26, or other suitable material, is disposed in the openings 25, above the cap nuts 17, in order to seal the cover to the body frame and exclude the dust.

The bosses 7 are located at the extreme upper edge of the body frame, and the bolts 14, which secure said body frame to the base plate 3, terminate therein, and bolts 27 are provided for the purpose of attaching the base plate 3 to the insulating panel 18.

Although I have shown a meter case of specific construction, those skilled in the art will readily understand that various modifications in size, and in the arrangement and location of parts, may be effected without departing from the spirit of my invention, and I desire that only such limitations shall be imposed as are indicated in the appended claims.

I claim as my invention:

1. The combination with a supporting panel, of a box or case comprising a plurality of side pieces secured intimately together to constitute a single unit, internal integral corner bosses of less height than the side pieces, a base, and bolts which engage said bosses and terminate within the said box for securing the side pieces to the said base and to the supporting panel.

2. The combination with a supporting panel, of a base, a box comprising a body frame having materially enlarged internal and integral corner portions of less height than the body frame, and means for coöperating with the corner portions for removably attaching the body to the base and the base to the panel.

3. The combination with a supporting panel, of an instrument case comprising a plurality of side pieces secured intimately together at their ends and having enlarged integral internal portions, a base plate, and members for securing the enlarged portions to the base plate and the base plate to the panel, said members comprising clamping devices that terminate within the said case and are accessible from the front of the instrument case.

4. The combination with a supporting panel, of an instrument case, a base plate, and substantially alined means accessible from the front of the instrument case for detachably securing the said base plate to the panel and the case to the base plate.

5. The combination with a supporting panel, of an instrument case, a base plate, and means accessible from the front of the instrument case for detachably securing the said base plate to the panel and the case to the base plate.

6. The combination with a supporting panel, a base plate and a rectangular frame having integral inwardly projecting corner lugs, of bolts rigidly secured to said base plate intermediate their ends, one end of said bolts coöperating with said corner lugs for securing said frame to said base and the other ends coöperating with said supporting panel for attaching said base thereto.

7. The combination with a supporting panel, a base plate, and a rectangular frame having integral inwardly projecting corner lugs, of bolts rigidly secured to said base plate intermediate their ends, for attaching said base to said panel and means disposed within said frame and coöperating with said corner lugs and said bolts for independently and detachably securing said frame to said base.

8. The combination with a supporting panel, a base plate and a rectangular frame having integral inwardly projecting corner lugs, of bolts rigidly secured to said base and coöperating with said corner lugs for detachably securing said frame to said base, and other bolts for independently attaching said base to said supporting panel.

In testimony whereof, I have hereunto subscribed my name this 29th day of Sept., 1910.

FREDERICK W. ANDREW.

Witnesses:
W. G. Mylius,
B. B. Hines.